US012754023B2

(12) United States Patent
Kobayashi et al.

(10) Patent No.: US 12,754,023 B2
(45) Date of Patent: Oct. 6, 2026

(54) SERVER DEVICE, SYSTEM, AND OPERATION METHOD OF SYSTEM

(71) Applicant: TOYOTA JIDOSHA KABUSHIKI KAISHA, Toyota (JP)

(72) Inventors: Ryosuke Kobayashi, Nagakute (JP); Koichi Watanabe, Tokyo (JP); Motofumi Kamiya, Nagoya (JP); Masaki Nishino, Anjo (JP); Jean-Sebastien Boire, Yokohama (JP); Takuya Nishioka, Nagoya (JP); Yohei Nakanishi, Nagoya (JP); Masaki Makihara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/797,144

(22) Filed: Aug. 7, 2024

(65) Prior Publication Data

US 2025/0052584 A1 Feb. 13, 2025

(30) Foreign Application Priority Data

Aug. 10, 2023 (JP) ................................ 2023-131491

(51) Int. Cl.

*G01C 21/00* (2006.01)
*G01C 21/34* (2006.01)
*G01C 21/36* (2006.01)

(52) U.S. Cl.

CPC ..... *G01C 21/3438* (2013.01); *G01C 21/3469* (2013.01); *G01C 21/3682* (2013.01)

(58) Field of Classification Search

CPC .......... B60L 53/14; B60L 53/35; B60L 53/37; B60L 53/53; B60L 53/665; B60L 53/57;
(Continued)

(56) References Cited

U.S. PATENT DOCUMENTS 9,566,868 B2 * 2/2017 Jammer ................ B60L 53/665
10,124,688 B2 * 11/2018 Delp ....................... B60L 53/80
(Continued)

FOREIGN PATENT DOCUMENTS

JP 2020-60418 A 4/2020
JP 2021-148472 A 9/2021
WO 2013/061410 A1 5/2013

OTHER PUBLICATIONS

Communicated dated Feb. 17, 2026 in Japanese Application No. 2023-131491.

*Primary Examiner* — Logan M Kraft
*Assistant Examiner* — Sherman D Manley
(74) *Attorney, Agent, or Firm* — Sughrue Mion, PLLC

(57) ABSTRACT

A server device includes one or more communication interfaces and one or more processors that perform communication by the one or more communication interfaces. Based on information regarding a remaining charge in a battery of a power-feed-receiving vehicle, and information regarding a travel route, the one or more processors send, to the power-feed-receiving vehicle, either one or both of first information indicating a power feed facility near the travel route, and second information indicating a rendezvous point at which rendezvousing of the power-feed-receiving vehicle with a power-feeding vehicle is attainable.

15 Claims, 5 Drawing Sheets

(58) Field of Classification Search
CPC .......... B60L 53/66; B60L 53/16; B60L 53/18; B60L 53/305; B60L 2260/32; B60L 2240/622; B60W 10/18; B60W 10/20; B60W 2420/403; B60W 2556/50; B60W 60/0025; B60W 2720/106; B60W 2510/244; B60W 2756/10; G06Q 10/06311; Y02T 10/70; Y02T 10/7072; Y02T 90/12; Y02T 90/16
See application file for complete search history.

(56) References Cited

U.S. PATENT DOCUMENTS

| | | | | |
|---|---|---|---|---|
| 10,620,011 | B2 * | 4/2020 | Cheaz | G01C 21/3438 |
| 11,124,078 | B2 * | 9/2021 | Miller | B60L 50/60 |
| 2012/0109519 | A1 * | 5/2012 | Uyeki | B60L 53/68 701/426 |
| 2012/0271758 | A1 * | 10/2012 | Jammer | G07F 15/003 701/22 |
| 2013/0020993 | A1 * | 1/2013 | Taddeo | B60L 53/11 320/109 |
| 2018/0143029 | A1 * | 5/2018 | Nikulin | G01C 21/3415 |
| 2018/0257498 | A1 * | 9/2018 | Delp | B60L 53/80 |
| 2019/0128684 | A1 * | 5/2019 | Mizutani | G08G 1/202 |
| 2019/0132719 | A1 * | 5/2019 | Mizutani | B60L 53/14 |
| 2019/0376801 | A1 * | 12/2019 | Whitt | B60L 58/13 |
| 2020/0317067 | A1 * | 10/2020 | Miller | B60L 50/60 |
| 2020/0317074 | A1 * | 10/2020 | Miller | B60L 53/36 |
| 2020/0317077 | A1 * | 10/2020 | Schaffer | B60L 53/305 |
| 2020/0341472 | A1 * | 10/2020 | Zenner | B25J 13/085 |
| 2021/0293558 | A1 | 9/2021 | Namiki | |
| 2023/0415784 | A1 * | 12/2023 | Roy | B60L 53/57 |

* cited by examiner

SERVER DEVICE, SYSTEM, AND OPERATION METHOD OF SYSTEM

CROSS-REFERENCE TO RELATED APPLICATION

This application claims priority to Japanese Patent Application No. 2023-131491 filed on Aug. 10, 2023 incorporated herein by reference in its entirety.

BACKGROUND

1. Technical Field

The present disclosure relates to a server device, a system, and an operation method of the system.

2. Description of Related Art

There are cases in which battery electric vehicles (BEVs) and the like that are driven by batteries experience insufficient electric power while traveling. Various types of technology have been proposed to circumvent such situations. For example, Japanese Unexamined Patent Application Publication No. 2020-060418 (JP 2020-060418 A) discloses technology for searching for power feed facilities along travel routes when searching for travel routes for a battery electric vehicle.

SUMMARY

There is room for improvement regarding convenience in power feeding when users of battery electric vehicles travel along desired travel routes.

The present disclosure provides a server device and so forth that enable improvement in the convenience of power feeding.

A server device according to the present disclosure includes one or more communication interfaces and one or more processors that perform communication by the one or more communication interfaces. Based on information regarding a remaining charge in a battery of a power-feed-receiving vehicle, and information regarding a travel route, the one or more processors send, to the power-feed-receiving vehicle, either one or both of first information indicating a power feed facility near the travel route, and second information indicating a rendezvous point at which rendezvousing of the power-feed-receiving vehicle with a power-feeding vehicle is attainable.

In the above server, the one or more processors may decide the power feed facility or the rendezvous point within a range that is travelable from a current position of the power-feed-receiving vehicle, using the remaining charge.

In the above server, the one or more processors may send the second information on condition that a count of the power feed facilities within the range is a predetermined count.

In the above server, the one or more processors may rank a plurality of the power feed facilities in order of how short a waiting time is after the power-feed-receiving vehicle arrives.

In the above server, the one or more processors may rank a plurality of the rendezvous points in order of how small a difference is between a time at which the power-feed-receiving vehicle arrives and a time at which the power-feeding vehicle arrives.

In the above server, the one or more processors may send an instruction to the power-feeding vehicle, to travel to the rendezvous point.

In the above server, the one or more processors may send the instruction to the power-feeding vehicle on condition that information consenting to power feeding at the rendezvous point is received from the power-feed-receiving vehicle.

A system according to the present disclosure includes a server device and a power-feed-receiving vehicle that communicates with the server device. Based on information regarding a remaining charge in a battery of the power-feed-receiving vehicle, and information regarding a travel route, the server device sends, to the power-feed-receiving vehicle, either one or both of first information indicating a power feed facility near the travel route, and second information indicating a rendezvous point at which rendezvousing of the power-feed-receiving vehicle with a power-feeding vehicle is attainable.

In the above system, the server device may decide the power feed facility or the rendezvous point within a range that is travelable from a current position of the power-feed-receiving vehicle, using the remaining charge.

In the above system, the server device may send the second information on condition that a count of the power feed facilities within the range is a predetermined count.

In the above system, the server device may rank a plurality of the power feed facilities in order of how short a waiting time is after the power-feed-receiving vehicle arrives.

In the above system, the server device may rank a plurality of the rendezvous points in order of how small a difference is between a time at which the power-feed-receiving vehicle arrives and a time at which the power-feeding vehicle arrives.

In the above system, the server device may send an instruction to the power-feeding vehicle, to travel to the rendezvous point.

In the above system, the server device may send the instruction to the power-feeding vehicle on condition that information consenting to power feeding at the rendezvous point is received from the power-feed-receiving vehicle.

An operation method according to the present disclosure is an operation method of a system including a server device and a power-feed-receiving vehicle that communicates with the server device. The operation method including, by the server device, sending either one or both of first information indicating a power feed facility near a travel route of a power-feed-receiving vehicle, and second information indicating a rendezvous point at which rendezvousing of the power-feed-receiving vehicle with a power-feeding vehicle is attainable based on information regarding a remaining charge in a battery of the power-feed-receiving vehicle, and information regarding the travel route.

In the above operation method, the method may include deciding the power feed facility or the rendezvous point within a range that is travelable from a current position of the power-feed-receiving vehicle, using the remaining charge.

In the above operation method, the method may include sending the second information on condition that a count of the power feed facilities within the range is a predetermined count.

In the above operation method, the method may include ranking a plurality of the power feed facilities in order of how short a waiting time is after the power-feed-receiving vehicle arrives.

In the above operation method, the method may include ranking a plurality of the rendezvous points in order of how small a difference is between a time at which the power-feed-receiving vehicle arrives and a time at which the power-feeding vehicle arrives.

In the above operation method, the method may include sending an instruction to the power-feeding vehicle, to travel to the rendezvous point.

According to the server device and so forth according to the present disclosure, convenience of power feeding can be improved.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

An embodiment will be described below with reference to the drawings.

Figure 1:
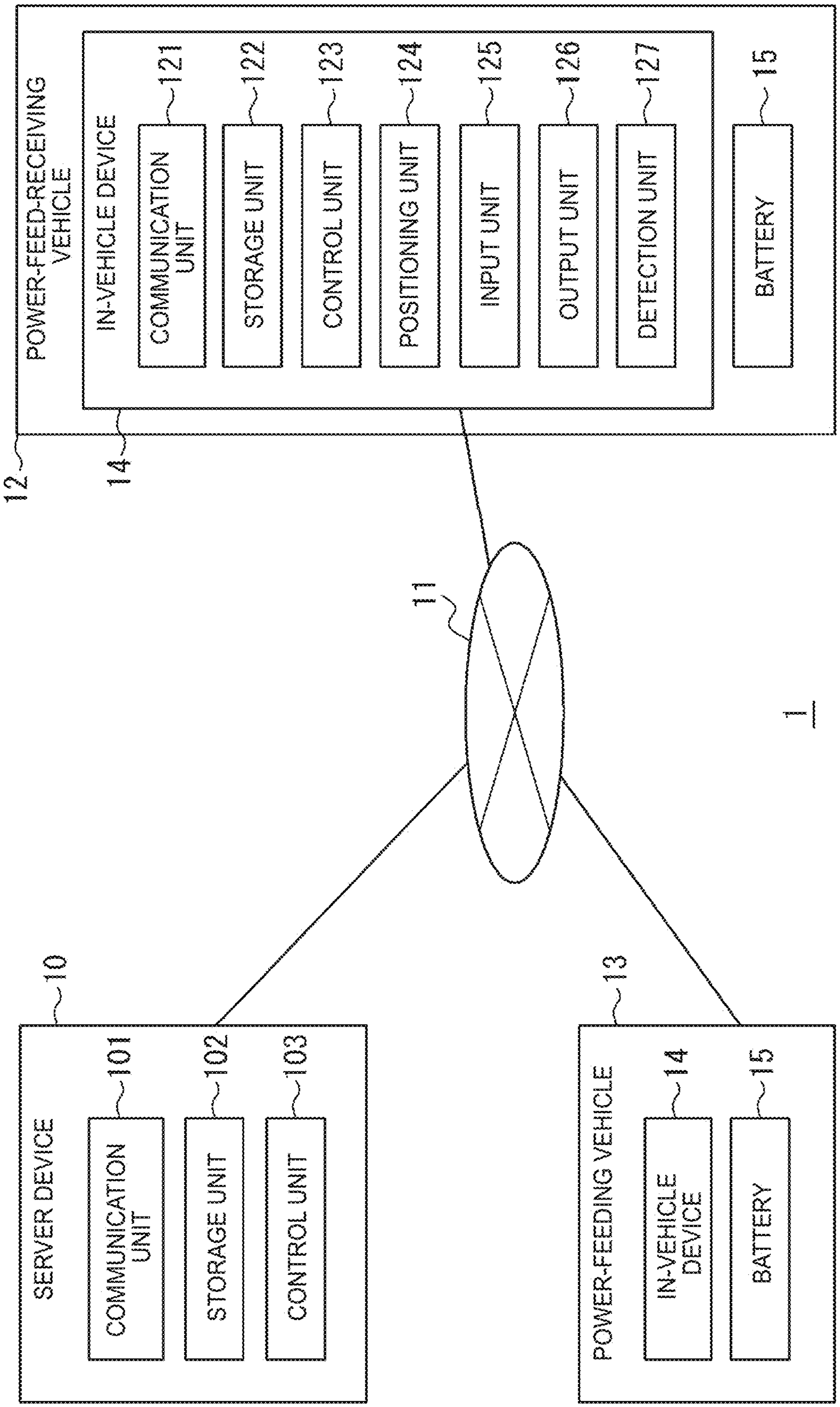
FIG. 1 is a diagram illustrating a configuration example of an information processing system.

FIG. 1 is a diagram illustrating a configuration example of an information processing system according to the embodiment. The information processing system 1 includes one or more server devices 10, one or more power-feed-receiving vehicles 12, and one or more power-feeding vehicles 13, which are connected to each other so as to be capable of communication of information via a network 11.

The server device 10 is, for example, a server computer belonging to a cloud computing system or other computing system and functioning as a server implemented with various types of functions.

The power-feed-receiving vehicle 12 is a passenger car or a commercial vehicle equipped with an in-vehicle device 14 having communication functions and information processing functions, and is connected to the network 11 via a mobile communication network. The power-feed-receiving vehicle 12 is, for example, a battery electric vehicle (BEV), a hybrid electric vehicle (HEV), a plug-in hybrid electric vehicle (PHEV), or the like, and is driven by electric power from a battery 15 that is installed. In the present embodiment, when the battery 15 needs to be charged, the power-feed-receiving vehicle 12 receives power feeding at a power feeding facility such as a charging station or the like, or receives power feeding from the power-feeding vehicle 13. The power-feed-receiving vehicle 12 may be driven by a driver, or the driving may be automated at any level.

The power-feeding vehicle 13 is a passenger car or a commercial vehicle having communication functions and information processing functions, and is connected to the network 11 via a mobile communication network. The power-feeding vehicle 13 has an in-vehicle device 14 and a battery 15 that are the same as those of the power-feed-receiving vehicle 12, and the battery 15 in the power-feeding vehicle 13 includes a battery that stores electric power for power feeding to the power-feed-receiving vehicle 12. The power-feeding vehicle 13 is a BEV, a HEV, a PHEV, or the like, that is driven by electric power from the battery 15 that is installed therein, but may also be a fuel cell electric vehicle (FCEV) or a gasoline automobile.

The network 11 is, for example, the Internet, but includes an ad hoc network, a local area network (LAN), a metropolitan area network (MAN), another network, or a combination thereof.

In the present embodiment, the information processing system 1 is a system for assisting power feeding to the power-feed-receiving vehicle 12 when the power-feed-receiving vehicle 12 experiences insufficient electric power. Power feeding to the power-feed-receiving vehicle 12 is performed at a power feed facility such as a charging station, or by performing roadside charging of the power-feed-receiving vehicle 12 by the power-feeding vehicle 13. Insufficient electric power includes a state in which remaining charge in 25 the battery has decreased to such an extent that the power-feed-receiving vehicle 12 cannot execute one or more functions including traveling, or a state in which the remaining charge in the battery has fallen below an optional remaining charge, but may be a state in which a user of the power-feed-receiving vehicle 12 optionally determines that power feeding is necessary. Roadside charging is a form in which power feeding is performed by the power-feeding vehicle 13 traveling to a position at which the power-feed-receiving vehicle 12 is situated, and charging the battery 15 of the power-feed-receiving vehicle 12 is performed from the battery 15 of the power-feeding vehicle 13. In the information processing system 1, roadside charging is executed by the server device 10 sending a travel instruction to the power-feeding vehicle 13 to perform power feeding to each of the one or more power-feed-receiving vehicles 12.

The server device 10 includes a communication unit 101, and a control unit 103 that performs communication by the communication unit 101. Based on information regarding the remaining charge of the battery 15 of the power-feed-receiving vehicle 12 and information regarding the travel route, the control unit 103 sends, to the power-feed-receiving vehicle 12, either one or both of first information indicating power feed facilities near the travel route (hereinafter referred to as facility information), and second information indicating a rendezvous point where the power-feed-receiving vehicle 12 can rendezvous with the power-feeding vehicle 13 (hereinafter, rendezvous information). According to such operations of the server device 10, the power-feed-receiving vehicle 12 receives either one or both of information regarding the location of the power feed facility near the travel route and information regarding the rendezvous point where roadside charging can be received from the power-feeding vehicle 13, and accordingly the user of the power-feed-receiving vehicle 12 can incorporate a plan for power feeding into the travel plan. Even when traveling through an area where power feed facilities are sparse, the user of the power-feed-receiving vehicle 12 can incorporate a plan for power feeding by roadside charging at a rendezvous point. Thus, convenience of power feeding can be improved.

Next, a configuration example of the server device 10, the power-feed-receiving vehicle 12, and the power-feeding vehicle 13, will be described.

The server device 10 has the communication unit 101, a storage unit 102, and the control unit 103. The server device 10 may be one computer, or may be made up of two or more computers that are connected so as to be capable of information communication, and to perform coordinated operations. When the server device 10 is made up of two or more computers, the configuration illustrated in FIG. 1 is distributed among the two or more computers as appropriate.

The communication unit 101 includes one or more communication interfaces. Examples of the communication interface include a LAN interface. The communication unit 101 receives information to be used for operations of the control unit 103, and transmits information obtained through operations of the control unit 103. The server device 10 is connected to the network 11 by the communication unit 101, and performs information communication with the power-feed-receiving vehicle 12 and the power-feeding vehicle 13 via the network 11.

The storage unit 102 includes, for example, one or more semiconductor memory devices, one or more magnetic memory devices, one or more optical memory devices, or a combination of at least two thereof, so as to function as a main storage device, an auxiliary storage device, or cache memory. The semiconductor memory is, for example, random access memory (RAM) or read-only memory (ROM). RAM is, for example, static RAM (SRAM) or dynamic RAM (DRAM). ROM is, for example, electrically erasable programmable ROM (EEPROM). The storage unit 102 stores information to be used for operations of the control unit 103 and information obtained through the operations of the control unit 103.

The control unit 103 includes one or more processors, one or more dedicated circuits, or a combination thereof. The processor is, for example, a general-purpose processor such as a central processing unit (CPU) or the like, or a dedicated processor specialized for specific processing such as a graphics processing unit (GPU) or the like. The dedicated circuit is, for example, a field-programmable gate array (FPGA) or an application-specific integrated circuit (ASIC) or the like. The control unit 103 executes information processing related to operations of the server device 10 while controlling each unit of the server device 10.

The functions of the server device 10 are realized by the processor included in the control unit 103 executing a control program. The control program is a program that causes a computer to execute processing of steps included in the operations of the server device 10, and thus causes the computer to realize functions corresponding to the processing of the steps. That is to say, the control program is a program that causes the computer to function as the server device 10. Also, part or all of the functions of the server device 10 may be realized by the dedicated circuits included in the control unit 103. Further, the control program may be stored in a non-transitory recording/storage medium that can be read by the server device 10, and the server device 10 may read the control program from the medium.

The power-feed-receiving vehicle 12 has the in-vehicle device 14 and the battery 15. The in-vehicle device 14 has a communication unit 121, a storage unit 122, a control unit 123, a positioning unit 124, an input unit 125, an output unit 126, and a detection unit 127. One or more of these units may be configured as a single control device, or may be configured as a smartphone, a tablet device such as a tablet terminal or the like, a navigation device, or the like. Alternatively, each unit may be connected so as to be capable of communicating information via an in-vehicle network that conforms to a standard such as Controller Area Network (CAN) or the like. The battery 15 is, for example, one or more lithium-ion batteries that charge and discharge electric power for driving the power-feed-receiving vehicle 12.

The communication unit 121 includes one or more communication interfaces. The communication interface is, for example, an interface compatible with a mobile communication standard such as Long Term Evolution (LTE), 4th generation (4G), 5th generation (5G), or the like. The communication unit 121 receives information to be used for operations of the control unit 123, and also transmits information obtained through operations of the control unit 123. The control unit 123 is connected to the network 11 through the communication unit 121 via a mobile communication base station, and performs information communication with the server device 10 and so forth via the network 11.

The storage unit 122 includes one or more semiconductor memory devices, one or more magnetic memory devices, one or more optical memory devices, or a combination of at least two thereof. The semiconductor memory is, for example, RAM or ROM. The RAM is, for example, SRAM or DRAM. The ROM is, for example, EEPROM.

The storage unit 122 functions as, for example, a main storage device, an auxiliary storage device, or cache memory. The storage unit 122 stores information to be used for operations of the control unit 123 and information obtained through the operations of the control unit 123.

The control unit 123 includes one or more processors, one or more dedicated circuits, or a combination thereof. The processor is a general-purpose processor such as a CPU or the like, or a dedicated processor specialized for specific processing. The dedicated circuit is, for example, an FPGA or an ASIC. The control unit 123 executes information processing related to operations of the power-feed-receiving vehicle 12, while controlling each unit of the in-vehicle device 14.

The positioning unit 124 includes one or more Global Navigation Satellite System (GNSS) receivers. The GNSS includes, for example, at least one of the following: Global Positioning System (GPS), Quasi-Zenith Satellite System (QZSS), BeiDou, Global Navigation Satellite System (GLONASS), and Galileo. The positioning unit 124 sends positioning results to the control unit 123, and the control unit 123 finds position information regarding the power-feed-receiving vehicle 12.

The input unit 125 includes one or more input interfaces. The input interface is, for example, a physical key, a capacitive key, a pointing device, a touch screen integrated with a display, or a microphone that receives voice input. The input interface may further include a camera that captures a taken image or an image code, or an IC card reader. The input unit 125 accepts manipulations to input information to be used for the operations of the control unit 123, and sends the input information to the control unit 123.

The output unit 126 includes one or more output interfaces. The output interface is, for example, a display or a speaker. The display is, for example, a liquid crystal display (LCD) or an organic electroluminescence (EL) display. The output unit 126 outputs information obtained through operations of the control unit 123.

The detection unit 127 has an interface for interfacing with one or more sensors that detect a state of each part of the power-feed-receiving vehicle 12, or has the one or more sensors. The sensors include, for example, a sensor that detects the remaining charge of the battery 15, a sensor that detects a motion state (speed, front-rear direction acceleration, right-left direction acceleration, deceleration, and so forth) of the power-feed-receiving vehicle 12, and so forth. The detection unit 127 sends information indicating each state detected by the sensors to the control unit 123.

The functions of the control unit 123 are realized by a processor included in the control unit 123 executing a control program. The control program is a program that causes the computer to execute processing of the steps included in operations of the control unit 123, and thereby causes the computer to realize the functions corresponding to the processing of the steps. That is to say, the control program is a program that causes the computer to function as the control unit 123. Part or all of the functions of the control unit 123 may also be realized by a dedicated circuit included in the control unit 123.

The power-feeding vehicle 13 has an in-vehicle device 14 equivalent to that of the power-feed-receiving vehicle 12, and the above description of the in-vehicle device 14 of the power-feed-receiving vehicle 12 applies. The battery 15 of the power-feeding vehicle 13 includes a battery that charges and discharges electric power for power feeding to the power-feed-receiving vehicle 12.

Figure 2:
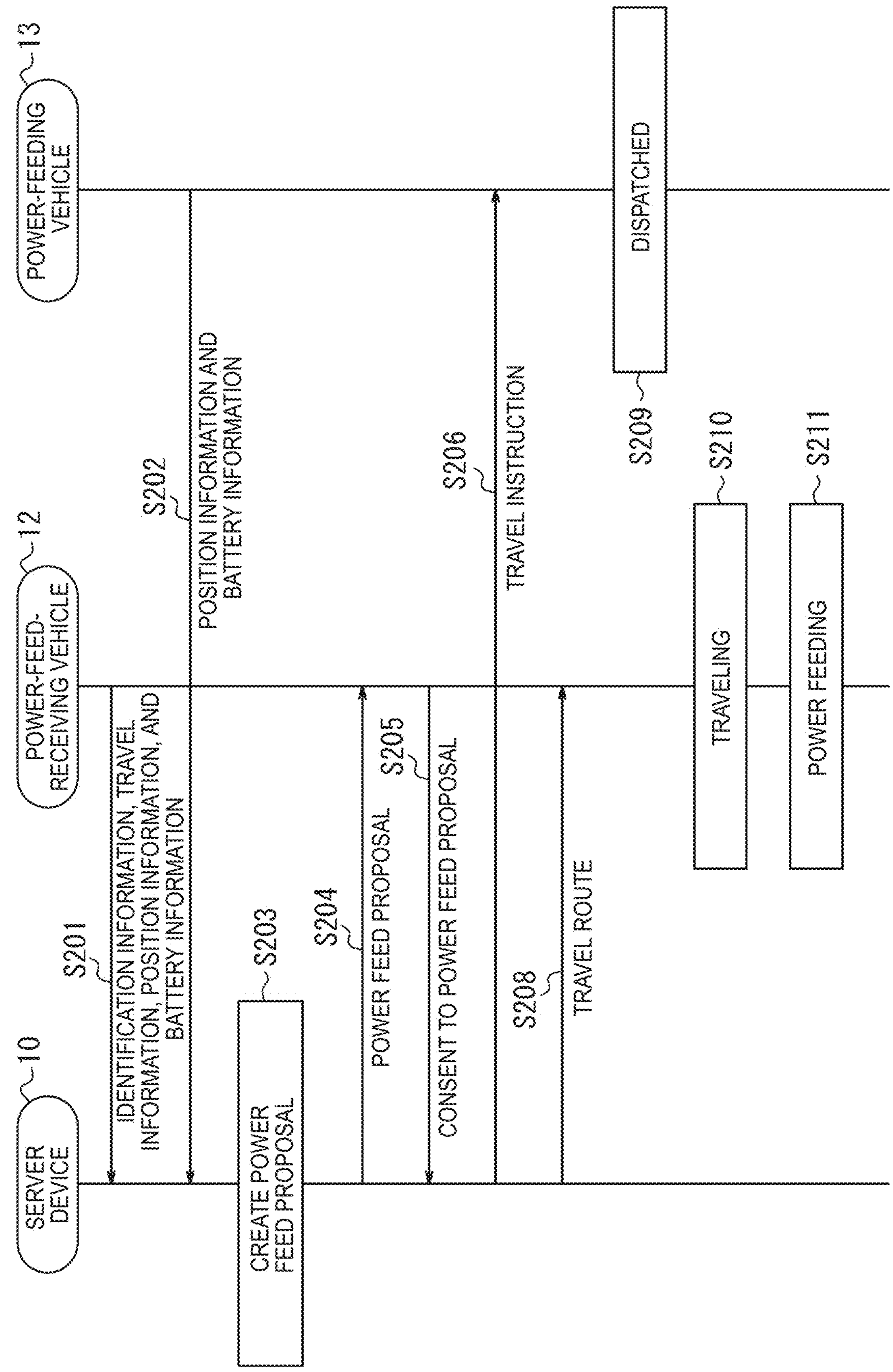
FIG. 2 is a diagram showing an example of operation procedures of a server device and a power-feeding vehicle.

FIG. 2 is a sequence diagram showing an example of procedures for coordinated operations of the server device 10, the power-feed-receiving vehicle 12, and the power-feeding vehicle 13. Steps related to various types of information processing of the server device 10, the power-feed-receiving vehicle 12, and the power-feeding vehicle 13 in FIG. 2 are executed by the respective control units 103, 123, and 123. Also, in the steps related to exchange of various types of information among the server device 10, the power-feed-receiving vehicle 12, and the power-feeding vehicle 13, are executed by the respective control units 103, 123, and 123 exchanging information with each other via the respective communication units 101, 121, and 121. At the server device 10, the power-feed-receiving vehicle 12, and the power-feeding vehicle 13, the respective control units 103, 123, and 123 store information to be processed and exchanged, in the respective storage units 102, 122, and 122, as appropriate.

The procedures in FIG. 2 are an example of procedures when the server device 10 provides information for power feed assistance to the power-feed-receiving vehicle 12. The procedure in FIG. 2 is executed when the power-feed-receiving vehicle 12 searches for a travel route to a destination and travels along the travel route.

In S201, the power-feed-receiving vehicle 12 sends identification information, travel information, position information, and battery information, to the server device 10. The power-feed-receiving vehicle 12 sends each type of information to the server device 10 when the remaining charge of the battery falls below an optional reference and insufficient electric power is foreseen, or when the user determines that power feeding is necessary and inputs an instruction to the in-vehicle device 14 to send a power feed request. The determination reference for predicting insufficient electric power is, for example, an optional state of charge (SOC) value (30% to 40%) or less. The identification information is information that identifies the power-feed-receiving vehicle 12. The travel information includes the destination of the power-feed-receiving vehicle 12, the travel route from the current position to the destination, an estimated time of arrival, and so forth. The travel route is searched for by an automotive navigation system of the power-feed-receiving vehicle 12. When the information regarding the destination and the current position is sent from the power-feed-receiving vehicle 12 to the server device 10, and the server device 10 searches for a travel route, the server device 10 may hold the information regarding the travel route. The battery information includes information such as capacity, remaining charge, temperature, and so forth, of the battery 15. S201 is executed for each of one or more power-feed-receiving vehicles 12.

In S202, the server device 10 acquires position information and battery information from one or more power-feeding vehicles 13. The server device 10 requests various types of information for each power-feeding vehicle 13 from the one or more power-feeding vehicles 13, and acquires information sent from each power-feeding vehicle 13 in response to the request. The battery information includes information regarding the capacity and the remaining charge in the battery 15.

In S203, the server device 10 creates a power feed proposal. The power feed proposal includes either or both of facility information indicating a power feed facility near the travel route of the power-feed-receiving vehicle 12, and rendezvous information indicating a rendezvous point where the power-feed-receiving vehicle 12 can rendezvous with the power-feeding vehicle. Detailed procedures of S203 are shown in FIG. 3.

Figure 3:
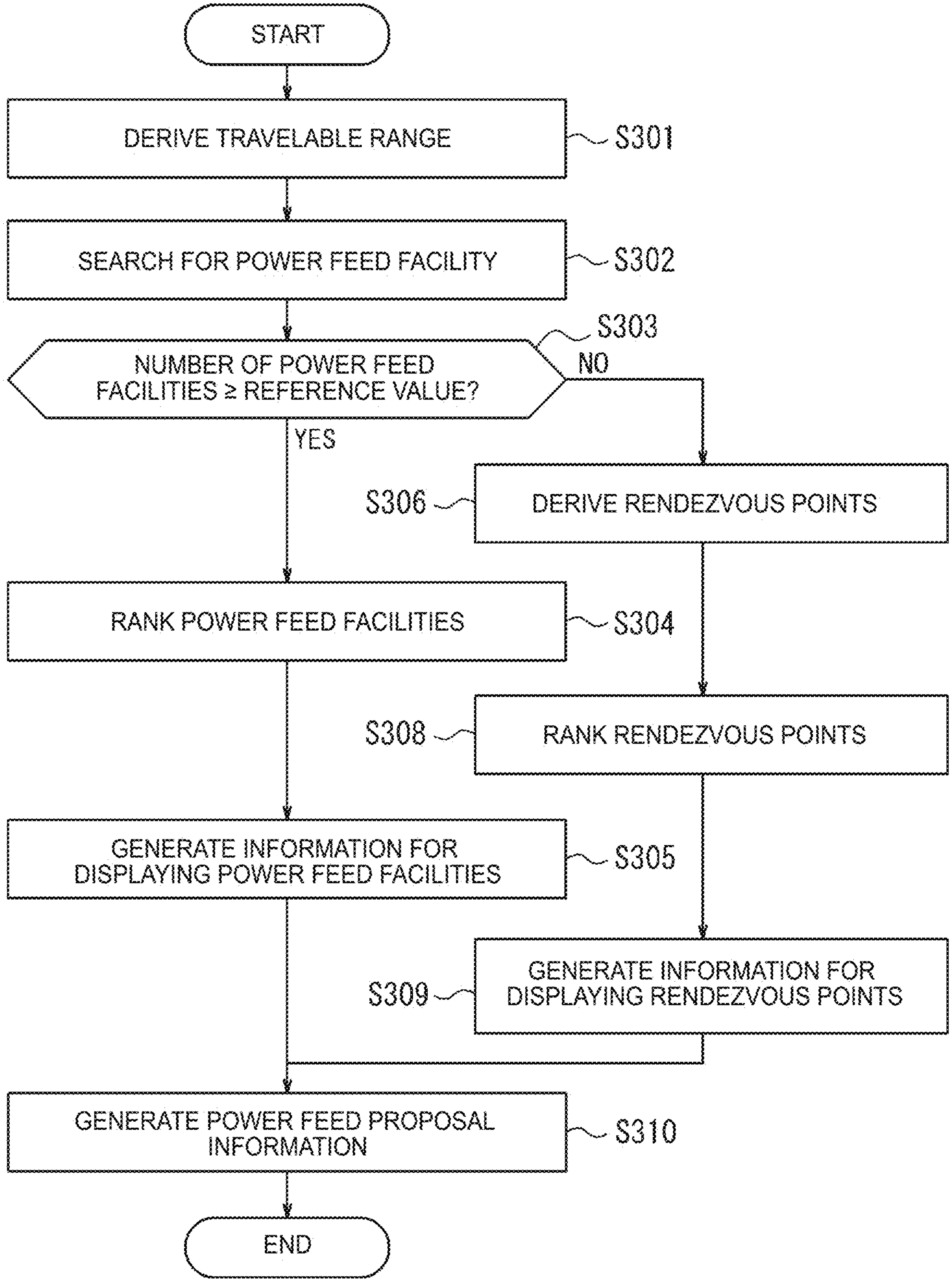
FIG. 3 is a diagram showing an example of operation procedures of the server device.

FIG. 3 is a flowchart showing operation procedures of the server device 10 related to creating a power feed proposal. The procedures in FIG. 3 are procedures of information processing executed by the control unit 103 of the server device 10.

In S301, the control unit 103 derives a travelable range. The travelable range is a range of distance that the power-feed-receiving vehicle 12 can travel on the remaining charge in the battery 15, along the travel route of the power-feed-receiving vehicle 12. The control unit 103 derives the travelable range using an optional algorithm, based on the identification information, the position information, and the battery information, acquired from the power-feed-receiving vehicle 12. For example, the control unit 103 derives the travel distance that the power-feed-receiving vehicle 12 is capable of traveling on the remaining charge in the battery 15 based on the identification information regarding the power-feed-receiving vehicle 12. The storage unit 102 stores identification information regarding the power-feed-receiving vehicle 12 so as to be associated with specification information regarding the vehicle, including mileage per unit electric power. The control unit 103 uses the mileage per unit electric power to derive a range of distance that can be traveled on the remaining charge in the battery 15 at that time, centered on the current position of the power-feed-receiving vehicle 12. The control unit 103 similarly derives a travelable distance range corresponding to passage of an optional period of time (e.g., several tens of minutes to several hours from the current time). The control unit 103 then derives a sum set of the derived travelable distance ranges over time, as the travelable range.

Figure 4:
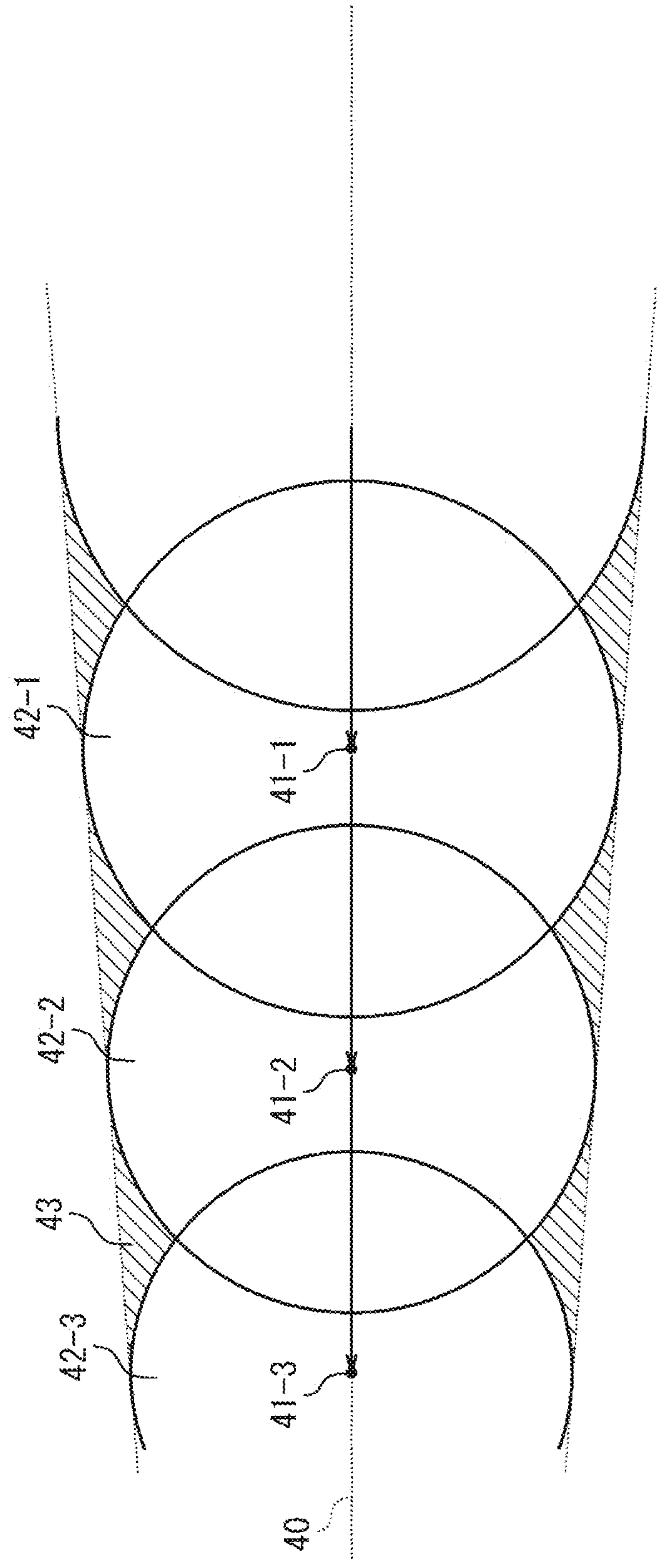
FIG. 4 is a diagram illustrating an example of a travelable range of a power-feed-receiving vehicle.

FIG. 4 is a diagram illustrating an example of the travelable range of the power-feed-receiving vehicle 12. FIG. 4 illustrates positions 41-1, 41-2, 41-3, and so on, of the power-feed-receiving vehicle 12 that change over time along a travel route 40, and travelable distance ranges 42-1, 42-2, 42-3, and so on, corresponding to each of the positions. The travelable distance ranges 42-1, 42-2, and 42-3 are circles of which the radius is an optional distance no greater than the distance that can be travelled on the remaining charge in the battery 15 at that point, when centered on the positions 41-1, 41-2, and 41-3, and so on, respectively. As the power-feed-receiving vehicle 12 travels and the position thereof changes in the order of the positions 41-1, 41-2, and 41-3, the remaining charge in the battery 15 decreases, and accordingly the travelable distance ranges 42-1, 42-2, and 42-3 become sequentially smaller. Now, connecting the travelable distance ranges 42-1, 42-2, 42-3, and so on, over optional time intervals, for example, derives a travelable range 43.

Returning to FIG. 3, in S302, the control unit 103 searches for a power feed facility located within the travelable range of the power-feed-receiving vehicle 12. The control unit 103 searches for such a power feed facility using map information stored in the storage unit 102. The control unit 103 then advances to S304 when the number of power feed facilities that are found is no less than an optional reference value (Yes in S303), and advances to S306 when the number of power feed facilities that are found is less than the reference value (No in S303). The optional reference value is, for example, three to five.

In S304, the control unit 103 ranks the power feed facilities. The control unit 103 ranks the power feed facilities in order of how short waiting time is from the arrival of the power-feed-receiving vehicle 12 until the power feed facility becomes available. For example, the control unit 103 acquires information regarding reservations for power feeding at each power feeding facility from a server that manages and controls the power feeding facilities. Further, the control unit 103 uses the position information regarding each power feed facility to derive an estimated arrival time at which the power-feed-receiving vehicle 12 can arrive at each power supply facility from the current position. The control unit 103 then derives, for each power feed facility, the waiting time from the estimated arrival time of the power-feed-receiving vehicle 12 to the time when the power supply facility will become available, and ranks the power feed facilities in order of how short the waiting time is.

In S305, the control unit 103 generates information for displaying the power feed facilities. The control unit 103 generates an image for display by superimposing, on a map, the position, the destination, and the travel route, of the power-feed-receiving vehicle 12, positions of the power feed facilities, and ranks thereof.

In S306, the control unit 103 derives rendezvous points within the travelable range of the power-feed-receiving vehicle 12. A rendezvous point is a parking lot at which space can be secured for the power-feed-receiving vehicle 12 and the power-feeding vehicle 13 to park adjacent to each other. The control unit 103 searches for parking lots within the travelable range of the power-feed-receiving vehicle 12, as rendezvous points, from the map information.

In S308, the control unit 103 ranks the rendezvous points. The control unit 103 ranks the rendezvous points in order of how short the waiting time is from the power-feed-receiving vehicle 12 arriving until the power-feeding vehicle 13 arrives. For example, the control unit 103 uses the position information regarding each power-feeding vehicle 13 to identify the power-feeding vehicle 13 nearest to each rendezvous point. At this time, the control unit 103 may set conditions for selecting the nearest power-feeding vehicle 13, in which the remaining charge in the battery 15 of the power-feeding vehicle 13 is no less than an optional reference value (e.g., 50% in terms of SOC value). Furthermore, the control unit 103 derives the estimated arrival time at which the nearest power-feeding vehicle 13 can arrive at each rendezvous point. The control unit 103 then derives the waiting time from the estimated arrival time of the power-feed-receiving vehicle 12 to the estimated arrival time of the power-feeding vehicle 13 for each rendezvous point, and ranks the rendezvous points in order of how short the waiting time is.

In S309, the control unit 103 generates information for displaying the rendezvous points. The control unit 103 generates an image for display by superimposing, on the map, the position, the destination, the travel route, of the power-feed-receiving vehicle 12, positions of the rendezvous points, and ranks thereof.

In S310, the control unit 103 generates power feed proposal information. The control unit 103 generates an image for displaying power feed facilities, or an image obtained by combining this with an image for displaying rendezvous points, as an image for power feed proposal. That is to say, the image for power feed proposal is an image in which the position, the destination, and the travel route, of the power-feed-receiving vehicle 12, and the positions and ranks of the power feed facilities, are superimposed on the map, or an image in which the positions and ranks of the rendezvous points are superimposed on this image.

Figure 5:
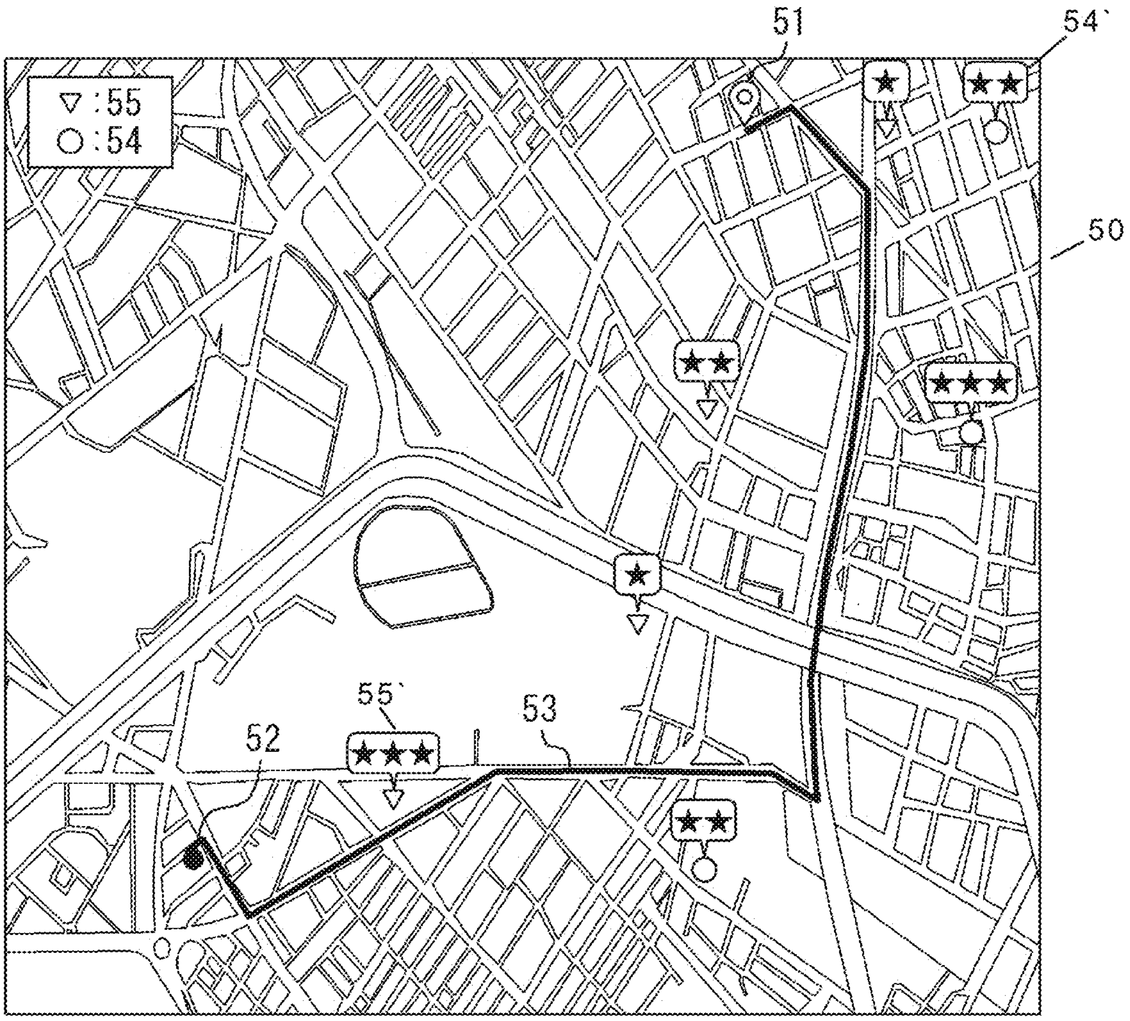
FIG. 5 is a diagram illustrating an example of a display screen of a power feed proposal.

Returning to FIG. 2, in S204, the server device 10 sends information regarding the power feed proposal to the power-feed-receiving vehicle 12. The power-feed-receiving vehicle 12 outputs a power feed proposal image as illustrated in FIG. 5, for example, on a display or the like, and prompts the user to confirm. As illustrated in FIG. 5, a power feed proposal image 50 includes a current position 51, a destination 52, and a travel route 53 of the power-feed-receiving vehicle 12. The power feed proposal image 50 further includes power feed facilities 54 and ranks 54' thereof, and rendezvous points 55 and ranks 55' thereof, near the travel route 53. The ranks 54' and 55' each indicate the ranking by the number of star icons. That is to say, the greater the number of icons is, the higher the rank is. As a modification, in addition to each of the ranks 54' and 55', for example, the estimated arrival time, delay time, or the like, at the destination 52, due to passing through that point may be displayed.

Returning to FIG. 2, in S205, the power-feed-receiving vehicle 12 sends information regarding consent to the power feed proposal, to the server device 10. The consent to the power feed proposal includes information regarding the power feed facility or the rendezvous point specified by the user. The user selects a power feed facility or rendezvous point by, for example, performing a tap operation or the like on the desired power feed facility or rendezvous point in the power feed proposal image. When the user performs a selection input, the power-feed-receiving vehicle 12 responds by sending, to the server device 10, information indicating consent to the power feed proposal.

When a rendezvous point is selected, the server device 10 sends a travel instruction to the power-feeding vehicle 13 in S206. The travel instruction is sent to the power-feeding vehicle 13 nearest to the selected rendezvous point. The travel instruction includes information regarding the travel route to the rendezvous point, and a travel start time at which travelling should start. The travel route is derived based on the rendezvous point and the position of the power-feeding vehicle 13. Also, the travel start time is derived based on the travel route.

In S209, the power-feeding vehicle 13 is dispatched in response to the travel instruction. When the travel start time comes, the power-feeding vehicle 13 starts traveling by automated driving in accordance with the travel route. Alternatively, the power-feeding vehicle 13 displays the travel route to an occupant, and starts traveling in response to being manipulated by the occupant.

In S208, the server device 10 sends information regarding the travel route to the power-feed-receiving vehicle 12. When a rendezvous point is selected under consent to the power feed proposal in S205, the server device 10 derives the travel route from the current position of the power-feed-receiving vehicle 12 to the rendezvous point that is selected. Alternatively, when a power feed facility is selected under consent to the power feed proposal in S205, the server device 10 derives the travel route from the current position of the power-feed-receiving vehicle 12 to the power feed facility that is selected. Note that in this case, S206 and S209 are omitted. In the power-feed-receiving vehicle 12, the travel route to the rendezvous point or the power feed facility is displayed, and the user confirms the displayed travel route.

In S210, the power-feed-receiving vehicle 12 starts traveling along the travel route.

In S211, the power-feed-receiving vehicle 12 arrives at the rendezvous point, rendezvouses with the power-feeding vehicle 13, and receives power feeding from the power-feeding vehicle 13, or arrives at the power feed facility and receives power feeding from the power feed facility.

According to an arrangement such as described above, the power-feed-receiving vehicle 12 can acquire either one or both of information regarding the location of the power feed facility near the travel route and information regarding the rendezvous point where roadside charging can be received from the power-feeding vehicle 13, and accordingly the user of the power-feed-receiving vehicle 12 can incorporate a plan for power feeding into the travel plan. Even when traveling through an area where power feed facilities are sparse, the user of the power-feed-receiving vehicle 12 can incorporate a plan for power feeding by roadside charging at a rendezvous point. Furthermore, taking ranking information for each rendezvous point or each power feed facility into consideration enables the user to make a selection to shorten the waiting time. Further, according to the modification, the user can comprehend the estimated arrival time at the destination or delay time. Thus, convenience of power feeding can be improved.

Although the embodiment is described above based on the drawings and examples, it should be noted that those skilled in the art can readily make various modifications and alterations thereto based on the present disclosure. It is therefore to be understood that these modifications and alterations are within the scope of the present disclosure. For example, the functions and so forth included in each means, each step, or the like, can be rearranged so as not to be logically inconsistent, and a plurality of means, steps, and so forth may be combined into a single means, step, and so forth, or each means, each step, and so forth, may be divided into multiple means, multiple steps, and so forth.

Part of the embodiment according to the present disclosure is exemplified below. However, it should be noted that the embodiment of the present disclosure is not limited to thereto.

[Appendix 1] A server device includes a communication unit and a control unit that performs communication by the communication unit, in which, based on information regarding a remaining charge in a battery of a power-feed-receiving vehicle, and information regarding a travel route, the control unit sends, to the power-feed-receiving vehicle, either one or both of first information indicating a power feed facility near the travel route, and second information indicating a rendezvous point at which rendezvousing of the power-feed-receiving vehicle with a power-feeding vehicle is attainable.

[Appendix 2] The server device according to Appendix 1, in which the control unit decides the power feed facility or the rendezvous point within a range that is travelable from a current position of the power-feed-receiving vehicle, using the remaining charge.

[Appendix 3] The server device according to Appendix 2, in which the control unit sends the second information on condition that a count of the power feed facilities within the range is a predetermined count.

[Appendix 4] The server device according to Appendix 2 or 3, in which the control unit ranks a plurality of the power feed facilities in order of how short a waiting time is after the power-feed-receiving vehicle arrives.

[Appendix 5] The server device according to any one of Appendices 2 to 4, in which the control unit ranks a plurality of the rendezvous points in order of how small a difference is between a time at which the power-feed-receiving vehicle arrives and a time at which the power-feeding vehicle arrives.

[Appendix 6] The server device according to Appendix 5, in which the control unit sends an instruction to the power-feeding vehicle, to travel to the rendezvous point.

[Appendix 7] The server device according to Appendix 6, in which the control unit sends the instruction to the power-feeding vehicle on condition that information consenting to power feeding at the rendezvous point is received from the power-feed-receiving vehicle. [Appendix 8] A system includes a server device and a power-feed-receiving vehicle that communicates with the server device, in which, based on information regarding a remaining charge in a battery of the power-feed-receiving vehicle, and information regarding a travel route, the server device sends, to the power-feed-receiving vehicle, either one or both of first information indicating a power feed facility near the travel route, and second information indicating a rendezvous point at which rendezvousing of the power-feed-receiving vehicle with a power-feeding vehicle is attainable.

[Appendix 9] The system according to Appendix 8, in which the server device decides the power feed facility or the rendezvous point within a range that is travelable from a current position of the power-feed-receiving vehicle, using the remaining charge.

[Appendix 10] The system according to Appendix 9, in which the server device sends the second information on condition that a count of the power feed facilities within the range is a predetermined count.

[Appendix 11] The system according to Appendix 9 or 10, in which the server device ranks a plurality of the power feed facilities in order of how short a waiting time is after the power-feed-receiving vehicle arrives.

[Appendix 12] The system according to any one of Appendices 9 to 11, in which the server device ranks a plurality of the rendezvous points in order of how small a difference is between a time at which the power-feed-receiving vehicle arrives and a time at which the power-feeding vehicle arrives.

[Appendix 13] The system according to Appendix 12, in which the server device sends an instruction to the power-feeding vehicle, to travel to the rendezvous point.

[Appendix 14] The system according to Appendix 13, in which the server device sends the instruction to the power-feeding vehicle on condition that information consenting to power feeding at the rendezvous point is received from the power-feed-receiving vehicle. [Appendix 15] An operation method of a system that includes a server device and a power-feed-receiving vehicle that communicates with the server device, in which, based on information regarding a remaining charge in a battery of the power-feed-receiving vehicle, and information regarding a travel route, the server device sends, to the power-feed-receiving vehicle, either one or both of first information indicating a power feed facility near the travel route, and second information indicating a rendezvous point at which rendezvousing of the power-feed-receiving vehicle with a power-feeding vehicle is attainable.

[Appendix 16] The operation method according to Appendix 15, in which the server device decides the power feed facility or the rendezvous point within a range that is travelable from a current position of the power-feed-receiving vehicle, using the remaining charge.

[Appendix 17] The operation method according to Appendix 16, in which the server device sends the second information on condition that a count of the power feed facilities within the range is a predetermined count.

[Appendix 18] The operation method according to Appendix 16 or 17, in which the server device ranks a plurality of the power feed facilities in order of how short a waiting time is after the power-feed-receiving vehicle arrives.

[Appendix 19] The operation method according to any one of Appendices 16 to 18, in which the server device ranks a plurality of the rendezvous points in order of how small a difference is between a time at which the power-feed-receiving vehicle arrives and a time at which the power-feeding vehicle arrives.

[Appendix 20] The operation method according to Appendix 19, in which the server device sends an instruction to the power-feeding vehicle, to travel to the rendezvous point.

What is claimed is:

1. A server device comprising:

one or more communication interfaces; and one or more processors that perform communication by the one or more communication interfaces, wherein, based on information regarding a remaining charge in a battery of a power-feed-receiving vehicle, and information regarding a travel route, the one or more processors send, to the power-feed-receiving vehicle, either one or both of first information indicating a power feed facility near the travel route, and second information indicating a rendezvous point at which rendezvousing of the power-feed-receiving vehicle with a power-feeding vehicle is attainable, and wherein the one or more processors are configured to:

determine a range that is travelable by the power-feed-receiving vehicle from a current position of the power-feed-receiving vehicle using the remaining charge, derive a plurality of rendezvous points within the travelable range, acquire a state of charge (SOC) of a battery of a plurality of power-feeding vehicles, select, for each rendezvous point, a corresponding power-feeding vehicle on condition that the SOC of the battery is 50% or higher, and rank the plurality of the rendezvous points in order of how small a difference is between a time at which the power-feed-receiving vehicle arrives and a time at which the corresponding power-feeding vehicle arrives.

2. The server device according to claim 1, wherein the one or more processors determine a count of power feed facilities within the range that is travelable by the power-feed-receiving vehicle.

3. The server device according to claim 2, wherein the one or more processors send the second information on condition that the count of the power feed facilities within the range is a predetermined count.

4. The server device according to claim 2, wherein the one or more processors rank the power feed facilities in order of how short a waiting time is after the power-feed-receiving vehicle arrives.

5. The server device according to claim 1, wherein the one or more processors send an instruction to the corresponding power-feeding vehicle of a given rendezvous point to travel to the given rendezvous point on condition that information consenting to power feeding at the given rendezvous point is received from the power-feed-receiving vehicle.

6. The server device according to claim 1, wherein the one or more processors are configured to generate a display image by superimposing, on a map, the current position of the power-feed-receiving vehicle, a destination of the power-feed-receiving vehicle, the travel route of the power-feed-receiving vehicle, positions of the plurality of rendezvous points, and priority ranks of the plurality of rendezvous points, wherein the priority ranks are represented by a number of star icons.

7. The server device according to claim 1, wherein the one or more processors send, to the power-feed-receiving vehicle, both of the first information and the second information.

8. The server device according to claim 6, wherein the second information includes the display image.

9. The server device according to claim 1, wherein the one or more processors are configured to select, as the corresponding power-feeding vehicle for each rendezvous point, a nearest power-feeding vehicle to each rendezvous point that satisfies the condition that the SOC of the battery is 50% or higher.

10. A system comprising:

a server device; and a power-feed-receiving vehicle that communicates with the server device, wherein based on information regarding a remaining charge in a battery of the power-feed-receiving vehicle, and information regarding a travel route, the server device sends, to the power-feed-receiving vehicle, either one or both of first information indicating a power feed facility near the travel route, and second information indicating a rendezvous point at which rendezvousing of the power-feed-receiving vehicle with a power-feeding vehicle is attainable, and wherein the server device:

determines a range that is travelable by the power-feed-receiving vehicle from a current position of the power-feed-receiving vehicle using the remaining charge, derives a plurality of rendezvous points within the travelable range, acquires a state of charge (SOC) of a battery of a plurality of power-feeding vehicles, selects, for each rendezvous point, a corresponding power-feeding vehicle on condition that the SOC of the battery is 50% or higher, and ranks the plurality of the rendezvous points in order of how small a difference is between a time at which the power-feed-receiving vehicle arrives and a time at which the corresponding power-feeding vehicle arrives.

11. The system according to claim 10, wherein the server device determines a count of power feed facilities within the range that is travelable by the power-feed-receiving vehicle.

12. The system according to claim 11, wherein the server device sends the second information on condition that the count of the power feed facilities within the range is a predetermined count.

13. The system according to claim 11, wherein the server device ranks the power feed facilities in order of how short a waiting time is after the power-feed-receiving vehicle arrives.

14. The system according to claim 10, wherein the server device sends an instruction to the corresponding power-feeding vehicle of a given rendezvous point to travel to the given rendezvous point on condition that information consenting to power feeding at the given rendezvous point is received from the power-feed-receiving vehicle.

15. A server device comprising:

one or more communication interfaces; and one or more processors that perform communication by the one or more communication interfaces, wherein, based on information regarding a remaining charge in a battery of a power-feed-receiving vehicle, and information regarding a travel route, the one or more processors send, to the power-feed-receiving vehicle, either one or both of first information indicating a power feed facility near the travel route, and second information indicating a rendezvous point at which rendezvousing of the power-feed-receiving vehicle with a power-feeding vehicle is attainable, wherein the one or more processors are configured to:

determine a range that is travelable by the power-feed-receiving vehicle from a current position of the power-feed-receiving vehicle using the remaining charge, determine whether a number of power feed facilities within the range is larger than a threshold, in a case where the number of power feed facilities within the range is equal to or less than the threshold, send the second information, and in a case where the number of power feed facilities within the range is larger than the threshold, not send the second information, and wherein the threshold is between 3 to 5.

* * * * *